Patented Aug. 11, 1931

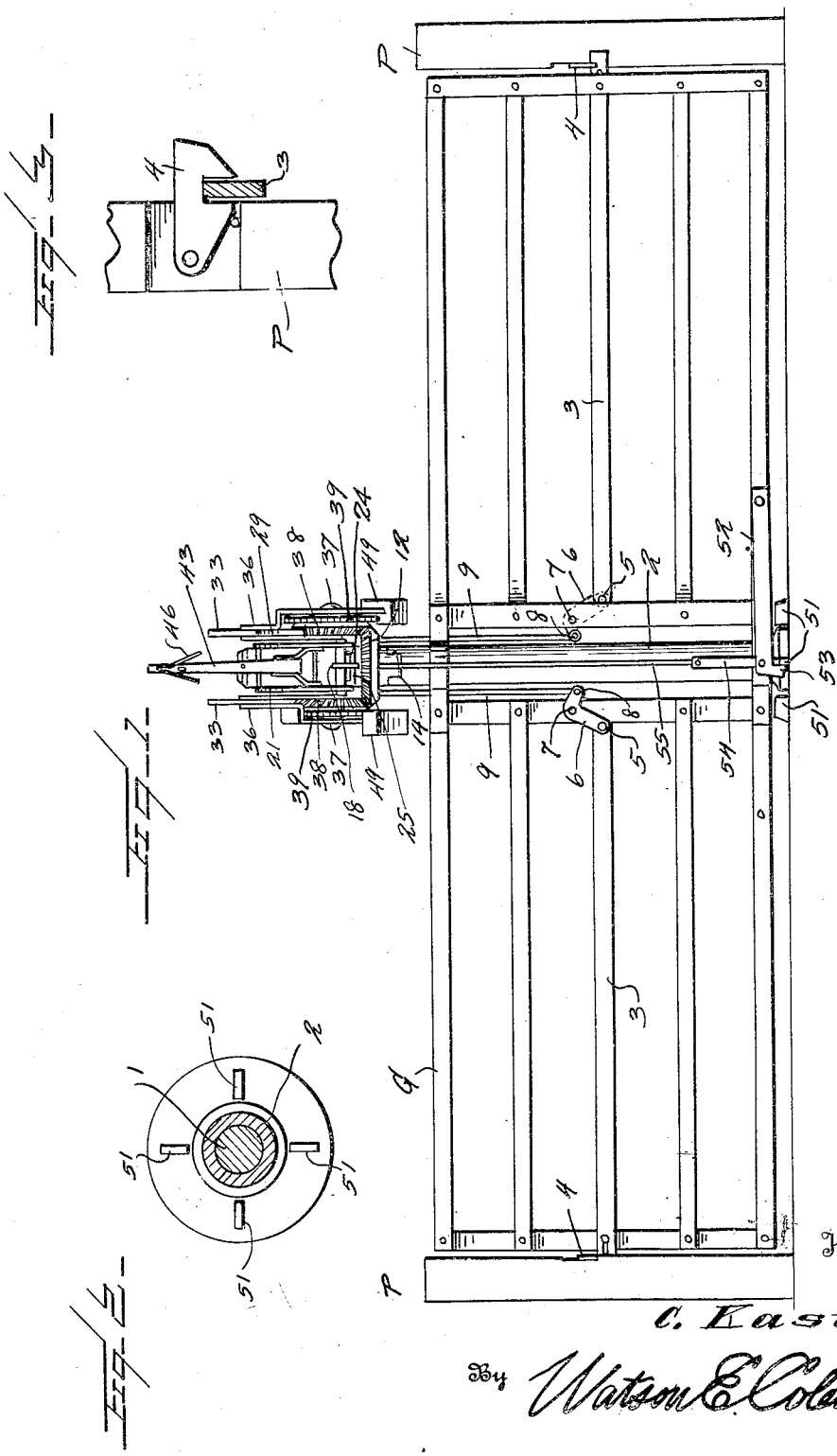

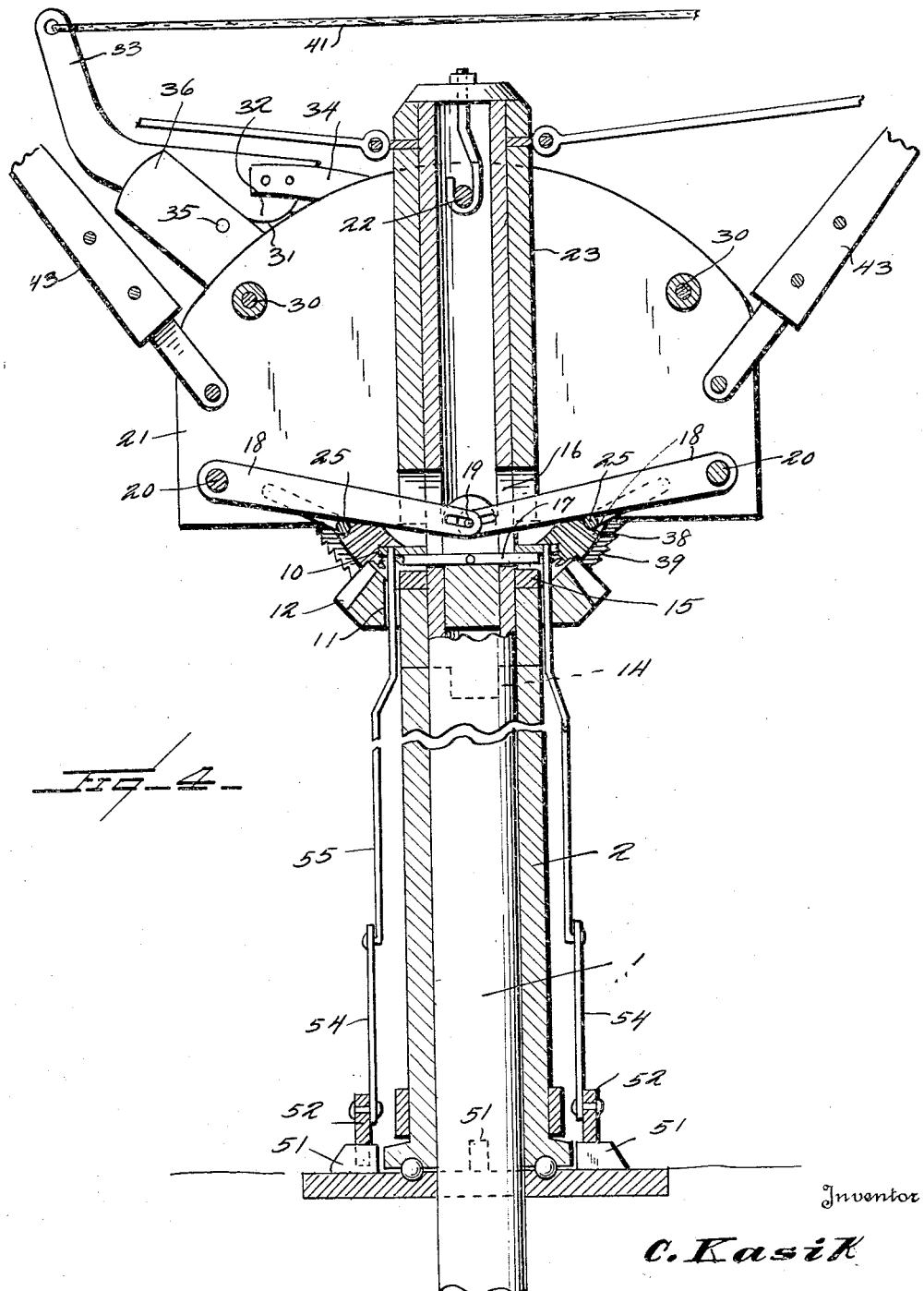

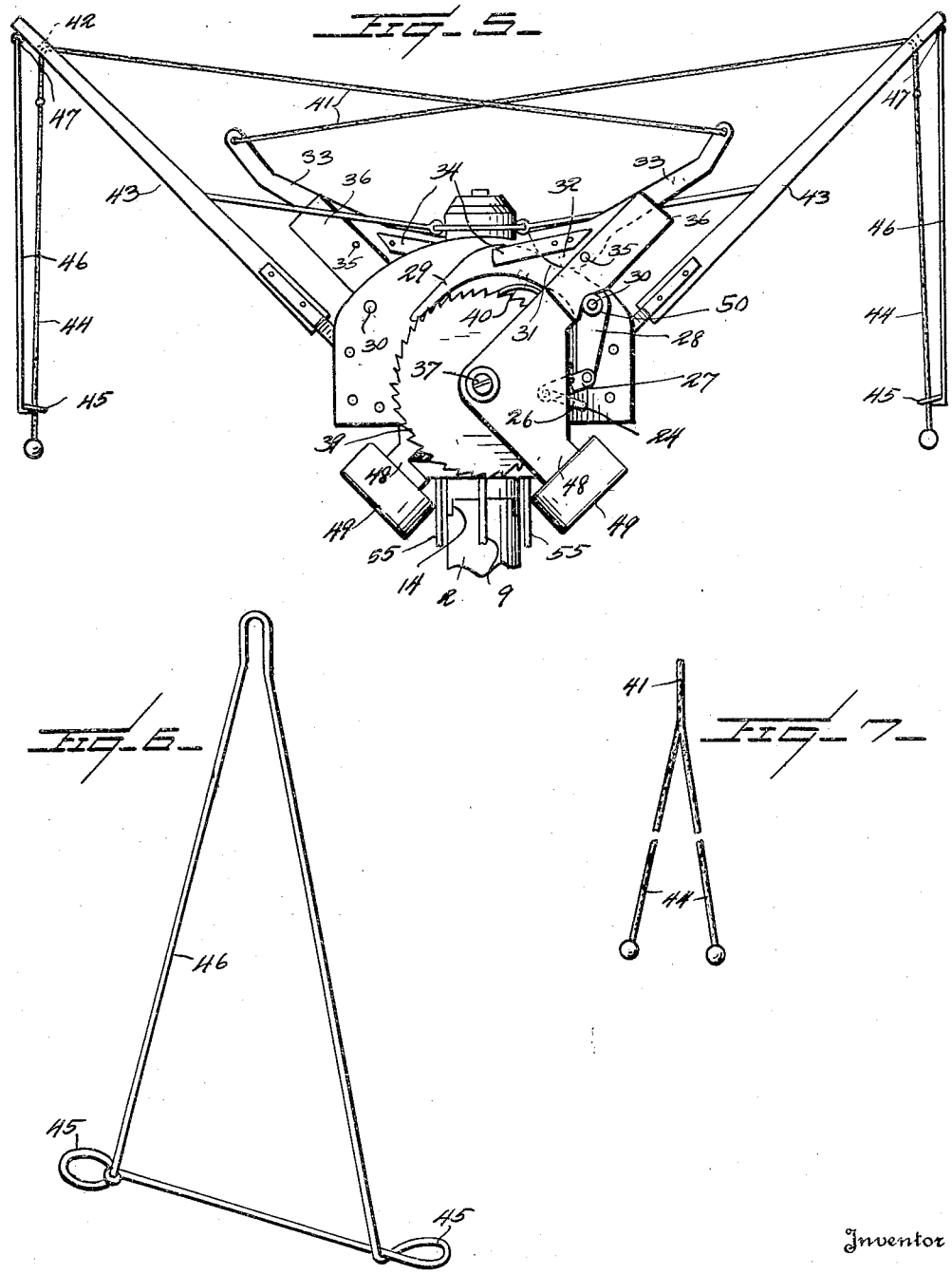

1,818,224

UNITED STATES PATENT OFFICE

CHARLES KASIK, OF REEDPOINT, MONTANA

GATE APPARATUS

Application filed March 25, 1930. Serial No. 438,788.

This invention relates to a gate apparatus, and it is an object of the invention to provide an apparatus of this kind whereby the gate from either side thereof may be readily and conveniently adjusted into either open or closed position and which desired operation can be effectively accomplished by a person standing on the ground or occupying a vehicle.

Another object of the invention is to provide an apparatus of this kind including means for effectively locking the gate in closed position, together with a structure associated therewith wherein said locking means is automatically released upon operation of the mechanism for moving the gate into open position.

The invention also has for an object to provide an apparatus of this kind comprising a vertically disposed member with which a gate is operatively engaged for swinging movement, together with an operating mechanism for the gate carried by said member.

The invention consists in the details of construction and in the combination and arrangement of the several parts of my improved gate apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in front elevation of a gate apparatus constructed in accordance with an embodiment of my invention, the gate proper being in closed position;

Figure 2 is a transverse sectional view taken through the vertically disposed member below the gate proper;

Figure 3 is a fragmentary view partly in section and partly in elevation of the latching means herein employed;

Figure 4 is an enlarged fragmentary view partly in vertical section and partly in elevation taken centrally of the operating means carried by the vertical member;

Figure 5 is a fragmentary view in side elevation of the upper portion of the apparatus as herein disclosed;

Figure 6 is a view in perspective of one of the guiding frames herein disclosed unapplied;

Figure 7 is a fragmentary elevational view of a flexible member and its branch members as herein set forth.

As disclosed in the accompanying drawings, 1 denotes a vertically disposed member of requisite dimensions and upon which is freely mounted for rotation a sleeve 2. This sleeve 2 carries a gate G extending beyond opposite sides thereof for closing the runway at opposite sides of the member 1. Each end portion of the gate G carries a slidable locking member 3 for coaction with a gravity operating latch member 4 carried by a suitably positioned post P.

The inner end portion of each of the locking members 3 is pivotally connected, as at 5, to the end portion of an arcuate lever 6, the central portion of which being supported, as at 7, by the gate G. Each of these levers 6 is disposed toward the member 1 and has pivotally engaged, as at 8, with its inner extremity an end portion of a rigid member or rod 9. This rod 9 is upwardly disposed and has its upper end portion connected to an annular member 10 surrounding the upper portion of the member 1 and free therefrom. These rods or members 9 are also freely disposed through a suitable opening 11 provided in the inner portion of a gear 12 freely mounted on the member 1 above the sleeve 2, the opposed portions of the hub of the gear 12 and the sleeve 2 being interlocked, as at 14, for unitary rotation around the member 1 and in the same direction. This interlocking engagement is such to permit application or removal of the gear 12 independently of the sleeve 2.

A collar 15 is secured to the member 1 immediately above the applied gear 12 to provide means for effectively maintaining the gear 12 and sleeve 2 in operative engagement and at the same time holding the sleeve 2 and the associated gate G against upward movement.

The portion of the member 1 immediately adjacent to and above the applied gear 12 is provided therethrough with the perpendicularly related slots 16 extending a desired distance lengthwise of the member 1 and through which extend the connected cross pins 17, the outer extremities of said pins underlying the annular member 10 and contacting therewith from below upon upward movement of the pins.

Extending within one of the slots 16 are the inner end portions of the substantially diametrically opposed levers 18, said inner or inserted end portions being operatively connected, as at 19, with the connected pins 17. The outer ends of these levers 18 are mounted for swinging movement in a vertical direction upon the cross pins 20 supported by the outer portions of the spaced and substantially parallel plates 21. These plates 21 at their longitudinal centers are suitably connected, as at 22, with a block or head 23 fixed to the upper portion of the member 1. Each of the levers 18 has positioned therebelow a rock shaft 24 supported by the plates 21 and said U-shaped rock shaft is provided with a crank 25 or the like constituting a lifting element for engagement with the lever 18 from below to swing the same upwardly to effect desired retraction of the locking members 3 from engagement with the latches 4 when it is desired to swing or turn the gate G into open position, said operation being effected and completed before the gate G begins to move.

One end portion of each of the shafts 24 is provided with a rock arm 26 which is operatively engaged by a rigid link 27 with the tail extension 28 of a rock lever 29, said lever 29 being supported, as at 30, for swinging movement by one of the plates 21. The lever 29 is disposed on a downward curvature and is of desired length and is provided in its upper marginal portion in relatively close proximity to its pivot 30 with a pocket or recess 31 to afford a seat for the cam end portion 32 of a lever 33. This lever 33 is operatively supported for swinging movement and has its outer or free end portion upwardly disposed. The cam end portion 32 of the lever 33 has extending forwardly therefrom the spaced arms 34 receiving therebetween the curved lever 29, thus assuring the cam portion 32 of the lever 33 at all times having effective engagement with the lever 29.

The lever 33 is pivotally connected, as at 35, between the upper portions of the arms 36 mounted for swinging movement upon an outstanding trunnion or spindle 37 carried by the head or block 23. The end portions of these arms 36 engaged with the trunnion or spindle 37 are spaced apart sufficient to receive therebetween a gear 38 freely mounted on the trunnion or spindle 37 and which is constantly in mesh with the gear 12 hereinbefore referred to. This gear 38 carries an annular ratchet 39 with which engages a spring pawl 40 carried by one of the arms 36 so that upon swinging movement of the arms 36 in one direction the gear 38 will be rotated.

The upper or free end portion of the lever 33 has fixed thereto a flexible member 41 which is directed through a guide opening 42 or its equivalent provided at the outer end portion of an upwardly and outwardly inclined rigid arm 43 connected to adjacent end portions of the plates 21. This flexible member 41 beyond the arm 43 is continued by the branch flexible members 44 extending through transversely spaced guide eyes 45 carried by an elongated triangular frame 46, the apex portion of which being swingingly connected, as at 47, to the upper or free end portion of the arm 43.

The outer arm 36 at its lower or the end portion engaged with the spindle or trunnion 37 is provided with an angular extension arm 48 carrying a weighted member 49 whereby the arms 36 are normally maintained at their limit of movement in one direction or in the direction of movement opposite to that imposed thereupon by pull of the flexible member 41. This limit of movement is controlled by contact of the outer arm 36 with the pivot member 30 for the lever 29, or more particularly the holding nut 50 engaged with said pivot member for holding such lever in applied position thereon.

I heretofore have described only one of the means for imparting swinging movement to the gate and as the two means herein disclosed are substantially duplicate it is believed that the foregoing description is sufficient other than to state that the means adjacent to one of the plates 21 operates reverse to that of the second of such means so that the gate G may be opened or closed at opposite sides of the gate.

In practice to open the gate it is only required to give a sudden pull or jerk upon a flexible member 41 as this will result in the gate G having full opening movement although if this does not occur a second pull or jerk may be readily given. This is also true in closing the gate.

Extending upwardly from the road level immediately adjacent the lower end of the applied sleeve 2 and in quarter relation therearound are the holding plates 51 and coacting at the same time with a pair of diametrically opposed plates 51 are the holding dogs 52 pivotally engaged with the gate G at opposite sides of the sleeve 2 and extending in a direction toward said sleeve. These dogs 52 at their free ends have depending lugs 53 for requisite engagement with the plates 51 when the gate is in either full open position or full closed position.

The free end portions of these dogs 52 have operatively engaged therewith the upstanding rigid arms 54 which also have operatively engaged therewith the rods or bars 55 which extend upwardly through the applied gear 12 and are connected to the annular member 10 so that as this member 10 is moved upwardly to release the locking members 3, these dogs 52 will also be raised sufficiently to free the same from the plates 51 so that the gate G may readily swing into either open or closed position.

It is also to be stated that upon pull being given on a lever 29 sufficient to release the gate, the arms 34 carried thereby will have contact with the arms 36 so that continued pull on the lever 29 will result in the desired swinging or rocking movement of the arms 36 to swing the gate G into either open or closed position.

From the foregoing description it is thought to be obvious that a gate apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An apparatus of the class described comprising an upstanding member, a sleeve rotating thereon, a gate carried by said sleeve, a gear rotatably supported by the member and operatively engaged with the sleeve for rotating the sleeve and gate upon rotation of the gear, a rock arm positioned adjacent to the gear, said rock arm and gear having coacting means for rotating the gear upon movement of the rock arm in one direction, and means for automatically moving the rock arm in the opposite direction, said movement of the rock arm in the second direction being independent of the gear.

2. An apparatus of the class described comprising an upstanding member, a sleeve rotating thereon, a gate carried by said sleeve, a gear rotatably supported by the member and operatively engaged with the sleeve for rotating the sleeve and gate upon rotation of the gear, a rock arm positioned adjacent to the gear, said rock arm and gear having coacting means for rotating the gear upon movement of the rock arm in one direction, and means for automatically moving the rock arm in the opposite direction, said movement of the rock arm in the second direction being independent of the gear, said coacting means comprising a ratchet rotating with the gear, and a pawl carried by the rock arm for engagement with the ratchet.

3. An apparatus of the class described comprising an upstanding member, a sleeve rotating thereon, a gate carried by said sleeve for swinging movement, a movable holding means carried by the gate, a rock lever, means coacting with the rock lever and the gate for swinging the gate upon movement of the rock lever in one direction, and means operated from the rock lever upon initial movement thereof in a direction to swing the gate to render the holding means inoperative.

4. An apparatus of the class described comprising a gate, means for supporting the gate for swinging movement, a rotatable member operatively engaged with the gate for swinging the gate upon rotation of said rotatable member, a releasable locking means carried by the gate, a rock arm, coacting means carried by the rock arm and the rotatable member for rotating said rotatable member upon movement of the rock arm in one direction, a second rock arm, an operating lever for the first rock arm coacting with the second rock arm for moving said second rock arm upon initial movement of the first rock arm, and an operative connection between the second rock arm and the locking means for moving said locking means into inoperative position upon movement of the second rock arm.

5. An apparatus of the class described comprising a gate, means for supporting the gate for swinging movement, a releasable locking means carried by the gate, a rotatable member operatively engaged with the gate for swinging the gate upon rotation of the rotatable member, a rock arm, means coacting with the rock arm and the rotatable member for rotating said rotatable member upon movement of the rock arm in one direction, a second rock arm, an operative connection between said second rock arm and the releasable locking means for moving the locking means into inoperative position and upon movement of the second rock arm in one direction, an operating lever carried by the first rock arm, said lever having means for moving the second rock arm in a direction to release the locking means of the gate upon initial movement of the operating lever.

In testimony whereof I hereunto affix my signature.

CHARLES KASIK.